UNITED STATES PATENT OFFICE.

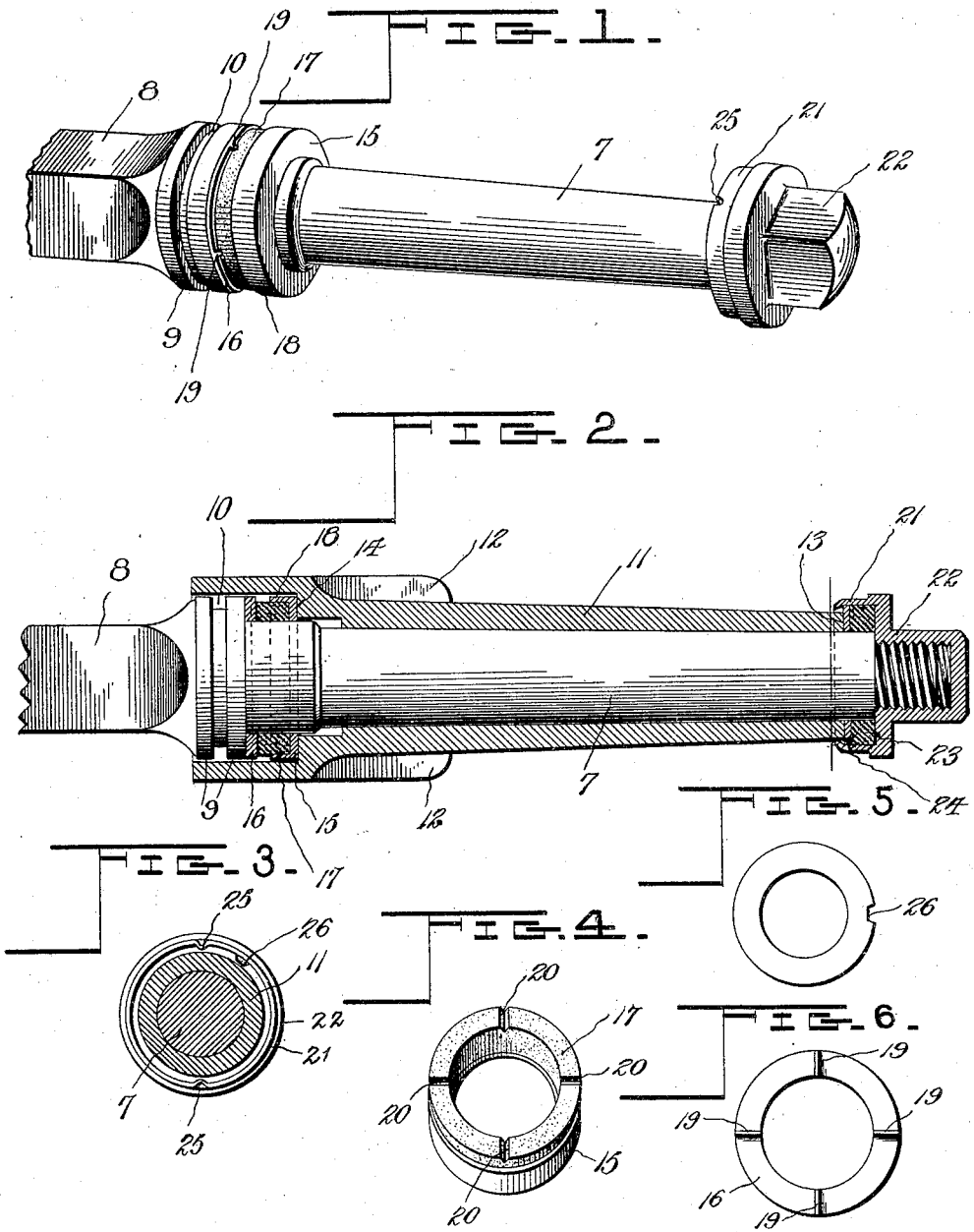

ROBERT McLAUGHLIN, OF OSHAWA, CANADA.

AXLE-BEARING.

SPECIFICATION forming part of Letters Patent No. 709,677, dated September 23, 1902.

Application filed March 5, 1902. Serial No. 96,755. (No model.)

*To all whom it may concern:*

Be it known that I, ROBERT MCLAUGHLIN, a subject of the King of Great Britain, residing at Oshawa, county of Ontario, Province of Ontario, Canada, have invented certain new and useful Improvements in Axle-Bearings; and I do hereby declare that the following is a full, clear, and exact description of the invention, such as will enable others skilled in the art to which it appertains to make and use the same.

My invention relates to an improved axle-bearing for wagons, carriages, and like vehicles; and the object of my invention is to provide such a bearing which will resiliently take the end thrust of the wheel thereon and while avoiding side jarring and shifting will also substantially lessen the wear.

It is the special object of the invention herein described to provide yieldable thrust-bearings for the ends of the hub-sleeve, these bearings consisting of elastic material, such as rubber, and to provide means for preventing the rotation of the resilient material relative to the metallic washers with which it is in contact and for preventing friction against the latter, and likewise to hold it in place, so as to prevent it from falling out separate or from moving up and down by reason of its extensibility when pressed upon by the thrust-shoulder of the hub-sleeve.

A further object of this invention is to provide for the retention of the yieldable member at the outer end of the hub by its inclosure in a suitable recess in the hub-nut which keeps the wheel in place, and at the same time to provide ready means whereby this yieldable member may be withdrawn from the hub-nut for inspection or renewal.

To these ends my invention consists in the provision of a flanged metallic washer at the inside of the wheel, and which is adapted to contain within the flange thereof a resilient washer of rubber or the like, in combination with a second washer having points or snugs forged thereon and adapted to project into corresponding recesses in the resilient washer in order to prevent any relative rotation between the resilient washer and the metallic washer.

My invention further consists in a recessed hub-nut having a resilient thrust-washer fitting in the recess thereof and covered by a metallic bearing-washer, the latter having a notch in its periphery and the flanged edge of the hub-nut having coacting dents or snugs formed on the inner side thereof, so as to prevent the withdrawal of the said washer except when the notch is opposite one of these snugs or dents.

My invention is more particularly described in the following specification, and the novel points thereof are set forth in the claims.

In the drawings accompanying this specification, Figure 1 is a perspective view of an axle embodying my improvements. Fig. 2 is a side elevation thereof, showing the hub-nut, hub-sleeve, and my improved thrust-bearings in section. Fis 3 is a transverse section on the line 3 3 of Fig. 2. Figs. 4, 5, and 6 are detail views showing the separate parts constituting my improvement.

The same numerals of reference denote like parts in all the figures of the drawings.

The axle-arm is shown at 7 and the axletree at 8, and the collar 9 is, as usual, formed at the inside of the arm 7 to take the thrust of the wheel. The collar 9 has a peripheral groove 10, as herein shown, to form a dust-guard, although this construction forms no part of my present improvement and is merely destined to indicate the way such axles are ordinarily formed. On the axle-arm 7 turns the hub-sleeve 11, which is formed with feathers 12 to prevent the hub of the wheel from turning relatively thereto, and this sleeve has square-faced bearing-surfaces 13 and 14 formed, respectively, on its outer end and near its inner end, as shown. The bearing-surface 14 coöperates with the inner face of the collar 9 to form a thrust-bearing; but between these two bearing-surfaces is inserted the compound bearing-washer forming a part of my improvement and consisting in two metallic washers 15 and 16, between which is a thick washer of resilient material 17. The washer 15 is, as shown, formed with a lateral flange 18, into which the washer 17 is snugly fitted, so as to be firmly held in place and prevented from spreading, while the washer 16 has formed on the side thereof adjacent to the washer 17 a series of transverse snugs 19, herein shown as four in number, (see Fig. 6,) these snugs being adapted to cooperate with similarly-located notches 20, formed in the corresponding face of the resilient washer 17. It will thus be seen that the washer 16 is prevented from turning relatively to the washer 17, and by reason of the snug-fitting flange 18 the washers 15 and 17 are likewise prevented from turning relatively to one another, the result being to form, substantially, a single compound washer whose opposite surfaces take indifferently the wear due to the end thrust of the wheel.

At the opposite end of the axle I provide a similar resilient thrust-bearing, this being located in a recess formed by an overlying lateral flange 21 upon the inside edge of the hub-nut 22. Within this recess is located the washer 23, of rubber or similar resilient material, and is covered by a metallic washer 24, which takes the wear in connection with the bearing-surface 13. In order to provide for holding both these washers in place when the hub-nut is removed, the edges of the flange 21 are bent inwardly at two opposite points thereof, so as to form snugs 25, which prevent the washer 24 from falling out; but the latter is provided at one point of its periphery with a notch 26, and the washer may be turned around until this comes opposite one of the snugs 25, when both washers may be readily lifted out. This construction effectually prevents the loss of the bearing-washers from the nut, which would occur without such provision.

Having thus described my invention, what I claim, and desire to secure by Letters Patent, is—

1. An axle-bearing comprising an axle-arm and a hub-sleeve both having thrust-bearing surfaces formed thereon, and a compound thrust-washer freely rotatable as a whole between said bearing-surfaces and comprising an elastic washer faced on both sides by metallic bearing-washers, one or both of which have snugs formed on their flat lateral faces interlocking with corresponding notches in the elastic washer.

2. An axle-bearing comprising an axle-arm having a collar, a hub having a thrust-bearing surface formed thereon coacting with said collar, and a compound thrust-washer comprising a washer freely rotatable as a whole between said bearing-surfaces and of resilient material, and metallic washers one on each side thereof, one of which has a lateral flange embracing said elastic washer to hold it in place.

3. An axle-bearing comprising an axle-arm having a thrust-collar, a hub-sleeve having a thrust-shoulder formed thereon, and a compound resilient thrust-washer located between said collar and shoulder and consisting of a heavy washer of elastic material having notches formed in one face thereof, a metallic washer having snugs formed on the adjacent face adapted to interlock with said notches, and a second metallic washer having a lateral flange adapted to firmly embrace said elastic washer and to form a seat therefor.

4. An axle-bearing comprising an axle-arm, a hub-sleeve turning thereon and having a bearing-surface formed on its outer end, a hub-nut having a lateral flange forming a recess, a washer of resilient material located in said recess, and a notched metallic bearing-washer overlying said resilient washer, said lateral flange of the hub-nut having snugs formed on its internal periphery adapted to coact with the edges of said metallic washer to hold the same in place and to permit the same to be removed when the notch therein is brought opposite one of said snugs, substantially as described.

5. An axle-bearing comprising an axle-arm, a hub-sleeve turning thereon and having a shouldered bearing-surface at its inner end and a squared bearing-surface upon its outer end, a collar upon said axle-arm coacting with the shoulder, a compound bearing-washer comprising a metallic washer having a lateral flange, a heavy elastic washer seated within said flange and having notches in its opposite face, and a second metallic washer having snugs on its adjacent face coöperating with said notches; a hub-nut upon the outer end of the axle having a laterally-projecting flange with a pair of snugs formed at opposite sides thereof and on its inner periphery, a heavy resilient washer fitting within the recess of said hub-nut, and a metallic bearing-washer overlying said last-named resilient washer and adapted to take the thrust at the outer end of the wheel, said last-named metallic washer having a notch in its periphery whereby it may be removed from the hub-nut when said notch is brought opposite one of the snugs thereon, substantially as described.

6. In a bearing an axle having a collar formed thereon provided with one or more lateral projections, in combination with an axle-box having a shoulder formed therein opposed to the said collar, an elastic washer located between the said collar and shoulder and engaging the said projections, and a metal washer adjacent to the said shoulder and flanged to partly lap over the said elastic washer, substantially as described.

7. In a bearing an axle, and a nut screwed on the end of the axle, in combination with an axle-box, an elastic washer located between the end of the axle-box and the nut, a flange formed on the nut extending inwardly, two projections formed on the flange extending in toward the axle, and a metal washer adapted to fit within the flange against the elastic washer and provided with notches in its edges so that it may be pressed in past the aforesaid projections and turned to engage them to hold the elastic washer in place, substantially as described.

8. In a bearing, an axle having a collar formed thereon provided with one or more lateral projections, in combination with an axle-box having a shoulder formed therein opposed to the said collar, an elastic washer located between the said collar and shoulder and engaging the said projections, a nut screwed on the end of the axle, an elastic washer located between the end of the axle and the nut, a flange formed on the nut extending inwardly, two projections formed on the flange extending in toward the axle, and a metal washer adapted to fit within the flange against the elastic washer and provided with notches in its edges so that it may be pressed in past the aforesaid projections and turned to engage them to hold the elastic washer in place, substantially as described.

In witness whereof I have hereunto set my hand in the presence of two witnesses.

ROBERT McLAUGHLIN.

Witnesses:
WM. MANNING,
E. G. ROSS.